United States Patent
Heuft et al.

(10) Patent No.: US 11,747,285 B2
(45) Date of Patent: Sep. 5, 2023

(54) TEST BOTTLE PROTOCOL METHOD

(71) Applicant: HEUFT SYSTEMTECHNIK GMBH, Burgbrohl (DE)

(72) Inventors: Bernhard Heuft, Burgbrohl (DE); Olga Kasdorf, Warburg (DE)

(73) Assignee: HEUFT SYSTEMTECHNIK GMBH, Burgbrohl (DE)

( * ) Notice: Subject to any disclaimer, the term of this patent is extended or adjusted under 35 U.S.C. 154(b) by 0 days.

(21) Appl. No.: 17/252,819

(22) PCT Filed: Jun. 14, 2019

(86) PCT No.: PCT/EP2019/065658
§ 371 (c)(1),
(2) Date: Dec. 16, 2020

(87) PCT Pub. No.: WO2019/243183
PCT Pub. Date: Dec. 26, 2019

(65) Prior Publication Data
US 2021/0278348 A1 Sep. 9, 2021

(30) Foreign Application Priority Data
Jun. 20, 2018 (DE) .................. 10 2018 004 917.6

(51) Int. Cl.
*G01N 21/90* (2006.01)
*G01N 21/93* (2006.01)

(52) U.S. Cl.
CPC ............. *G01N 21/90* (2013.01); *G01N 21/93* (2013.01)

(58) Field of Classification Search
CPC ..... G01N 21/90; G01N 21/93; G01N 21/9018
See application file for complete search history.

(56) References Cited

U.S. PATENT DOCUMENTS

| | | | |
|---|---|---|---|
| 4,990,792 A * | 2/1991 | Frei | B65B 61/025 365/126 |
| 2016/0054234 A1 | 2/2016 | Niedermeier | |
| 2017/0102340 A1 | 4/2017 | Niedermeier | |

FOREIGN PATENT DOCUMENTS

| DE | 43 02 656 C1 | 5/1994 |
|---|---|---|
| DE | 298 03 507 U1 | 9/1998 |

(Continued)

OTHER PUBLICATIONS

International Preliminary Report on Patentability issued in related application PCT/EP2019/065658, with English anguage translation, dated Dec. 22, 2020, 13 pages.

(Continued)

*Primary Examiner* — Tarifur R Chowdhury
*Assistant Examiner* — Amanda Merlino
(74) *Attorney, Agent, or Firm* — Leydig, Voit & Mayer, Ltd.

(57) ABSTRACT

In the method for checking a container inspection system with at least two detection devices, the at least two detection devices are configured to check a first and a second area of the containers to be inspected. A test container is fed to the container inspection system. The test container has a test feature in a first area to be inspected and a marking in a second area to be inspected, which is read by one of the detection devices and with which the test container can be identified as a test container. Also disclosed is a test container for use in connection with the disclosed method.

9 Claims, 2 Drawing Sheets

(56) References Cited

FOREIGN PATENT DOCUMENTS

| | | |
|---|---|---|
| DE | 299 10 452 U1 | 8/1999 |
| DE | 20 2006 020 193 U1 | 2/2008 |
| DE | 10 2012 204 277 A1 | 9/2013 |
| DE | 10 2013 103 992 A1 | 10/2014 |
| DE | 10 2015 203 060 A1 | 8/2016 |
| EP | 2 581 732 A1 | 4/2013 |
| JP | 2013-250247 A | 12/2013 |
| WO | WO 2009/021515 A1 | 2/2009 |

OTHER PUBLICATIONS

Search Report issued in related application DE 10 2018 004 917.6, dated Mar. 1, 2019, 8 pages.
Search Report issued in related application PCT/EP2019/065658, dated Sep. 27, 2019, with English language translation, 6 pages.
Japanese Patent Office, Notification of Reasons for Refusal in Japanese Patent Application No. 2020-566984 (dated Aug. 24, 2022).

\* cited by examiner

TEST BOTTLE PROTOCOL METHOD

CROSS-REFERENCE TO RELATED APPLICATIONS

This application is the U.S. national phase of the International Patent Application No. PCT/EP2019/065658 filed Jun. 14, 2019, which claims the benefit of German Patent Application No. 10 2018 004 917.6 filed Jun. 20, 2018, the entire content of which is incorporated herein by reference.

FIELD

The present application concerns a method for checking a container inspection system and a test container used in this method.

BACKGROUND

According to the state of the art, reliability tests for test devices, e.g. those for empty beverage bottles, so-called empty bottle inspectors, are carried out in such a way that a series of test bottles is prepared, each of which has one or more defects or test characteristics. The test bottles are then placed in the bottle flow at certain time intervals, e.g. every half hour, or after a certain number of bottles, e.g. 50,000 bottles. If all test bottles are detected as defective, the empty bottle inspector is assumed to function properly.

After inspection, the bottles that are identified as defective are separated from the bottle flow by automatic rejection devices. The system must be able to identify test bottles even if the empty bottle inspector is not working properly and should overlook a test feature of a test bottle.

In today's beverage and food industry, containers are transported with a throughput of up to 90,000 bottles per hour. For this reason, the time span available for inspecting the containers is very limited. In order to guarantee a reliable procedure for the inspection of bottle inspection systems under these conditions, it is known from DE 299 10 452 U1, for example, that test bottles are equipped with a concentric transponder containing a code number for the clear identification of the test bottle. The system has an additional detection device which is exclusively designed to read the transponder of the test bottles. The additional detection device complicates the design of such bottle inspection systems and it would therefore be desirable to provide a test bottle protocol method that does not require special additional detection devices that are only needed for test bottle detection.

DE 10 2012 204 277 A1 also describes a method and a device in which test bottles are provided with a special multidimensional code. The multidimensional code is read optically by a separate reading device. The reading device can be a scanner or similar and is exclusively intended to read the multidimensional code of the test bottles. However, this additional reading device again complicates the design of such bottle inspection systems.

SUMMARY

Disclosed is a reliable method by which test containers can be reliably detected by a container inspection system without the need for an additional detection device or reading device which is exclusively used for reading the test bottle marking. Furthermore, disclosed is a reliable method with which test containers can be reliably detected by a container inspection system, whereby for the detection of the test bottle marking only such detection devices are used which are already present in the container inspection system and are used for the bottle inspection or for the detection of the test features.

This task is solved in the method of the type mentioned above by feeding a test container to the container inspection system, which has a test feature in a first area to be inspected and a marking in a second area to be inspected. The marking can be read by one of the recognition devices of the container inspection system and is designed in such a way that the test container can thus be clearly identified as a test container.

Container inspection systems have a multitude of detection devices. These detection devices not only ensure that each container is completely recorded and checked, but also make it possible to check a multitude of different error sources in one inspection process. Commonly used detection devices are for example outer sidewall inspection, inner sidewall inspection, bottom inspection, liquid residue detection, especially alkaline residue detection, mouth inspection, thread inspection or rust ring detection. The sidewall inspection can be divided into several zones, which can then be regarded as detection devices independent of each other.

Since a large number of detection devices are already used in container inspection systems anyway, disclosed embodiments aim at providing a test container protocol method using exclusively existing detection devices. Thus, the method does not require an additional detection device which would only be used for the detection of the test containers.

In the present application, the term "test bottle marking" is used to designate markings by which a bottle can be identified as a test bottle. In the state of the art, these test bottle markings are, for example, RFID chips or barcodes for whose recognition separate reading devices are provided.

In the present application the term "detection device" is used to designate devices of the container inspection system which are used to inspect one or more areas of the containers to be examined. In contrast, the term "reading device" is used to designate a device which is only intended to detect a test bottle marking but which is not used for the inspection of individual or several areas of the containers to be examined. The use of reading devices as provided for in the prior art is avoided by means of the disclosed embodiments.

According to the present test container protocol method, an error or test feature to be detected is applied in an area of a test container to be examined and a corresponding marking is applied in another examinable area of a test container, which is identified by one of the detection devices as an indication of a test bottle. The marking may additionally also contain information to characterize the test feature. For example, information about the position, size, value or other properties of the test feature may be included in the marking. The detection devices are designed in such a way that a defect in a certain area only affects the detection devices in this area and has no influence on the error detection in other areas to be examined.

The marking only has to be designed in such a way that the detection device reliably detects the marking. This ensures in any case that the test bottle will be rejected from the bottle flow even if the container inspection system works incorrectly and has not detected the test feature itself. If a test feature is not correctly detected, appropriate measures are immediately taken with which the faulty inspection behavior is reported, or the inspection system is even stopped immediately.

The marking must therefore be designed so that it can be reliably detected by the inspection system at any time. For this purpose, the marking can be an optically readable code, for example a dot code, a raster, a watermark or another suitable large-area pattern such as a "checkered flag pattern". Since the marking is applied in an area of the test container that does not affect the error detection of the other areas, the marking can in principle be of any size—and thus easily detectable.

Preferably, the marking is a code that not only indicates that the container in question is a test container, but also contains additional information regarding the error feature. The code preferably identifies the test container in an unambiguous way. This allows the exact recording of which test container is currently being inspected. In addition, further information about the respective test container can be collected in this way. For example, it can be recorded how often the test container has already been examined, detected or not detected.

In order to increase the reliability of the test container protocol method, the marking can be provided in several or all areas to be examined that are not marked with the error to be detected. Ideally, all markings should be read correctly and provide the same information. However, if one of the detection devices should provide incorrect information or the marking is not detected at all, the redundant marking in another area can ensure that the test container is still detected as a test container.

Preferably, the marking not only contains information about the type and location of the test feature, but also about the additional areas where the marking is provided. If the information provided by the individual detection devices differs, appropriate verification measures should also be taken. Regardless, the system ensures that none of the test containers are inadvertently left in the product flow.

A test container can also have several test features in different container areas. Again, areas of the container that do not have a test feature can be marked with a marking that is read by the associated detection device and with which the test container can be detected. Due to a test container having several error features several detection devices can be checked at the same time and overall fewer test containers have to be used to check the inspection system. It is important here that the markings are placed in such a way that they are recognized by the already existing detection devices of the inspection system and that the test container does not require any additional detection devices.

If the marking is provided as an optical watermark, it may be formed by fine dots, lines or structures that differ from contamination of the containers. The optical watermark can also be defined by the frequency spectrum present in the optical watermark and can be read out by means of Fourier transform or another suitable orthogonal transformation.

The present application is also directed to a test container for inspection of a container inspection system, wherein the test container has in a first area to be inspected a test feature which can be detected by the first detection device, and wherein the test container has in a second area to be inspected a marking which is read by the second detection device and with which the test container can be identified as a test container.

The method for inspecting a container inspection system can also be used if the inspection system is only equipped with one detection device. This detection device must then be configured to detect a test feature of the test container on the one hand and to read a marking provided on the test container on the other hand with which the test container can be identified. This can be achieved, for example, if the marking is a large-area watermark or pattern that is detected parallel to the actual test feature. The detection of the test feature must of course not be influenced by the presence of the marking. If the marking is merely a large-area pattern that is applied to the container, this pattern can be detected using conventional image analysis methods, e.g. FFT transformation or addition of images. Such patterns, however, represent only a slight background variation for the primary error detection of the test feature, which can be neglected in primary error detection.

Various embodiments are described herein by way of example and not by way of limitation. Features described in connection with individual embodiments can also be used in connection with other embodiments, unless otherwise indicated or evident.

BRIEF DESCRIPTION OF THE DRAWINGS

Various embodiments are illustrated in the drawings, in which.

DETAILED DESCRIPTION

Figure 1:
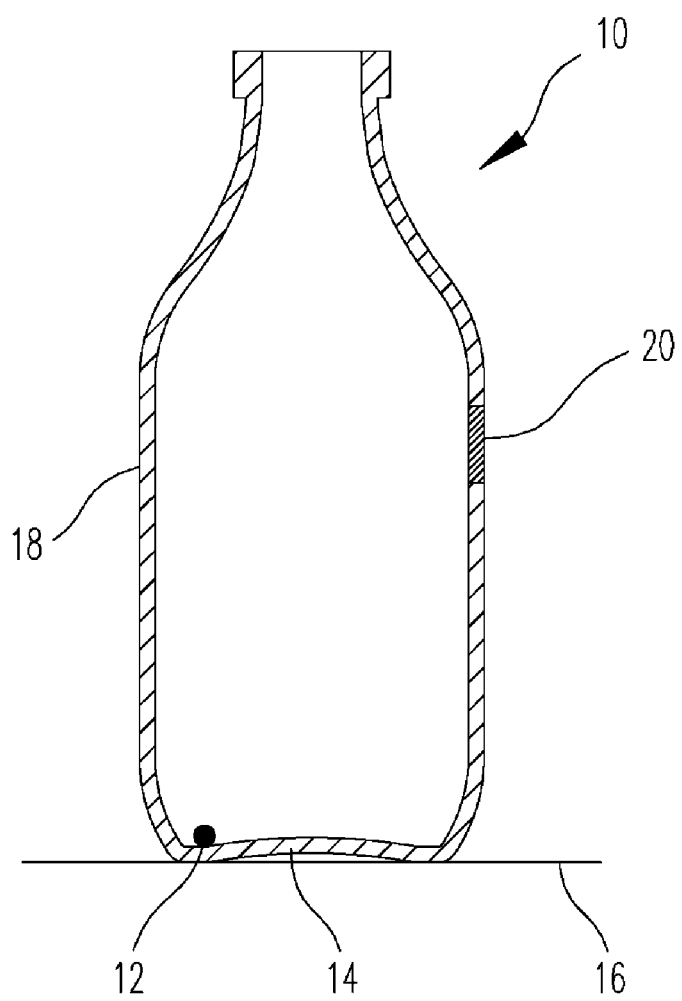
FIG. 1 is a test container with an error feature in the bottom area and a marking on the side wall.

FIG. 1 shows a test container 10, which is suitable for use in the test container protocol method disclosed herein. The test container 10 is a bottle, which as test feature 12 has an error in the bottom area 14. The test container 10 is placed in the bottle flow and passed through a container inspection system (not shown) on a conveyor 16.

In this case the test container 10 is prepared in such a way that a spherical foreign body is adhered to its bottom area as test feature 12, which must be detected by the container inspection system. A marking 20 is provided on the side wall 18 of the test container 10, with which the test container 10 can be unambiguously identified as a test container. The marking 20 also contains the information that the test feature 12 is a spherical foreign body, which is located in the bottom area 14 of the test container 10. In this case, the marking 20 on the side wall 18 is an adhesive label that can be easily detected and read by the cameras of the side wall inspection. An image analysis software known to the skilled person can be used to read the information given on the label 20.

When the test container 10 passes through the inspection system, the bottom inspection will detect the test feature 12, i.e. the error in the bottom area 14, and reject the bottle as erroneous. At the same time, the sidewall inspection will detect the marking 20 and identify the container as test container 10. A corresponding entry will then be made in the test bottle protocol so that the proper functioning of the container inspection system is documented.

However, if the test feature 12 is not recognized, the test container 10 is still recognized as test container 10 due to the marking 20 on the side wall 18 and is separated from the product flow. This ensures that no test container 10 remains in the product flow and possibly gets into the consumer circuit. In this case too, a corresponding entry is made in the test protocol and appropriate measures are taken to ensure the continued functioning of the inspection system. These measures may include ordering an inspection or even a temporary shutdown of the inspection system.

Figure 2:
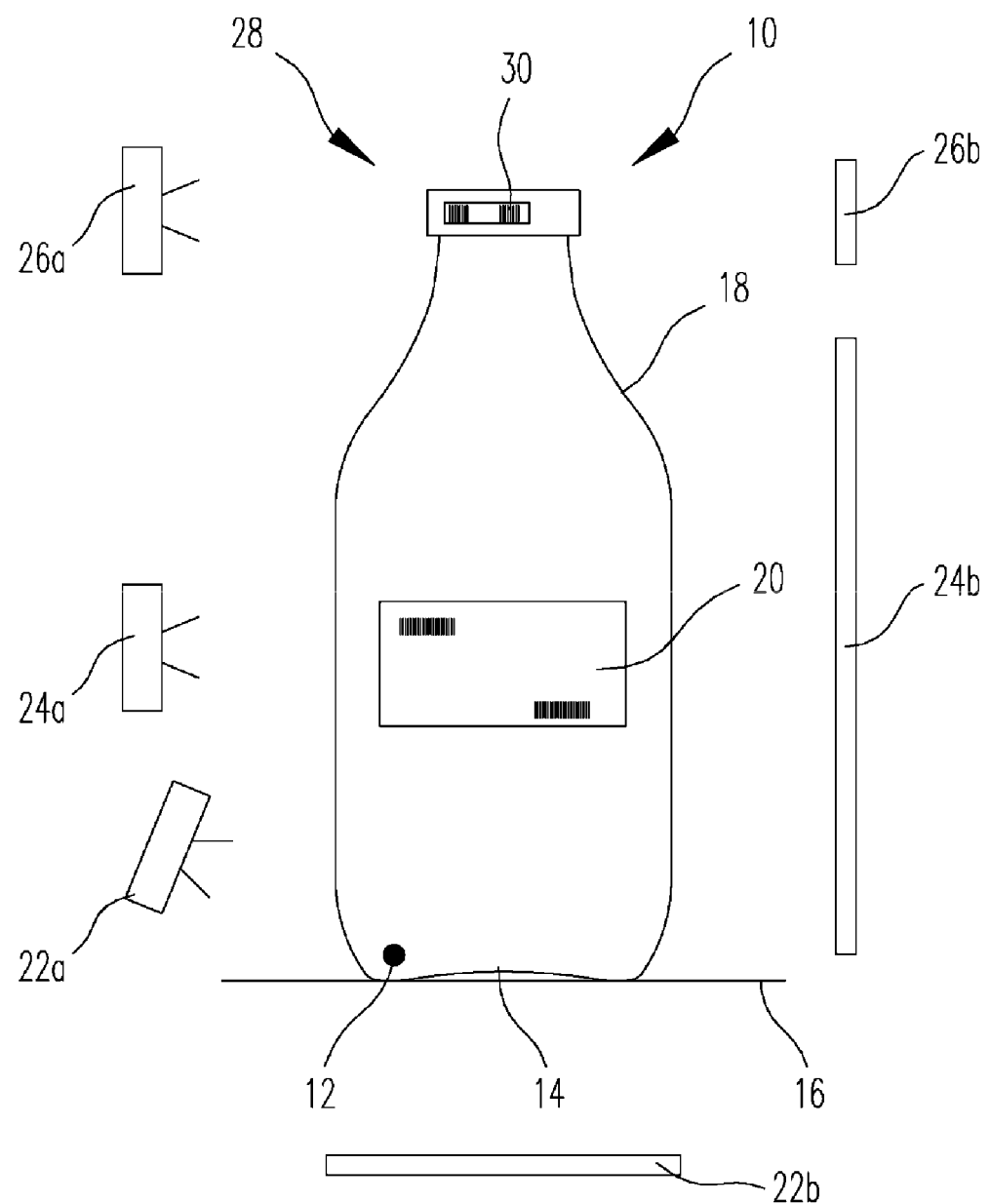
FIG. 2 is a test container with an error feature in the bottom area and markings on the side wall and in the mouth region.

FIG. 2 shows a further embodiment. Again, a test container 10 is passed through a container inspection system on a conveyor.

In this case, the container inspection system has three detection devices, namely a mouth inspection 22, a side wall inspection 24 and a bottom inspection 26. Each of these detection devices 22, 24, 26 is formed by a radiation source 22a, 24a, 26a and an associated detection device 22b, 24b, 26b.

The test container 10 again has an error 12 in the bottom area 14, which must be detected by the bottom inspection 26 a,b. In the other two test areas, i.e. on the side wall 18 and in the mouth region 28, a marking 20,30 is provided in each case, which identifies the container as test container 10 and contains the information about the type and location of the test feature 12.

The mode of operation of this embodiment is essentially identical to the mode of operation described in FIG. 1. However, the fact that in this case the marking 20, 30 is provided in two areas increases the operational safety of this embodiment even more. In the unlikely event that neither the bottom inspection 26 a,b detects the test feature 12 nor the side wall inspection 24 a,b detects the test container marking 20 on the side wall 18, the test container marking 30 is also provided in the mouth region 28 of the test container 10 as an additional redundant safety measure, so that a further detection device 22 a,b is provided here to identify the test container 10 as such.

Inadvertent failure to reject a test container 10 can be almost completely ruled out here, as it is extremely unlikely that all three detection devices 22 a,b, 24 a,b and 26 a,b will malfunction simultaneously.

With this embodiment, the protocol can be kept in such a way that not only is it recorded whether the test containers 10 have all been correctly detected, but it can also be recorded whether all detection devices 22 a,b, 24 a,b and 26 a,b have delivered consistent results. Depending on the performance of the individual detection devices 22 a,b, 24 a,b and 26 a,b, the inspection system can then be checked immediately or at a possibly more suitable later time.

The invention claimed is:

1. A method for checking a container inspection system configured to inspect a plurality of containers and having at least two detectors,
   wherein the at least two detectors include at least a first detector configured to check a first area of the containers for a container defect in the first area and a test marking in the first area, and a second detector configured to check a second area of the containers for a container defect in the second area and a test marking in the second area, and
   wherein a test container is fed into a flow of containers in the container inspection system, and wherein the test container has a test feature in the first area and a test marking in the second area, wherein the second detector detects and reads out the test marking in the second area of the test container to identify it as a test container, and the first detector detects the test feature in the first area.

2. The method according to claim 1, wherein the test marking is an optically readable code.

3. The method according to claim 2, wherein the code unambiguously identifies the test container.

4. The method according to claim 1, wherein the container inspection system further comprises one or more additional detectors configured to inspect different areas of the containers to be inspected, wherein the test container has a test feature in one of the first, second or different container areas, and wherein the other container areas of the test container are each provided with a test marking which is read out by the detectors associated with these test areas and with which the test container can be identified.

5. The method according to claim 1, wherein the container inspection system further comprises one or more additional detectors configured to inspect different areas of the containers to be inspected, wherein the test container is provided with several test features in different container areas and wherein container areas which do not have a test feature are provided with a test marking which is read out by the detectors associated with these test areas and with which the test container can be identified.

6. The method according to claim 1, wherein the detectors of the container inspection system comprise a bottom inspection, an outer sidewall inspection, an inner sidewall inspection, a alkaline residue detection, a thread inspection, a rust ring detection or a mouth inspection.

7. A container inspection system configured to inspect a plurality of containers, the system comprising at least a first detector configured to check a first area of the containers for a container defect in the first area and a test marking in the first area and a second detector configured to check a second area of the containers for a container defect in the second area and a test marking in the second area,
   wherein a test container is fed into a flow of containers in the container inspection system, and the test container has a test feature in the first area and a test marking in the second area, and
   wherein the second detector reads out the test marking in the second area of the test container to identify it as a test container, and the first detector detects the test feature in the first area.

8. The test container according to claim 7, wherein the test marking is an optically readable code.

9. A method for checking a container inspection system comprising the steps of:
   inspecting a plurality of containers with a first detector and a second detector which are configured to check, respectively, a first area and a second area of the containers to be inspected for a container defect and a test marking,
   feeding a test container into a flow of containers in the inspection system, the test container having a test feature in the first area and a test marking in the second area,
   detecting and reading out, by the second detector, the test marking in the second area to identify the test container as a test container, and
   detecting, by the first detector, the test feature in the first area.

* * * * *